US012689047B2

(12) United States Patent
Fischel

(10) Patent No.: US 12,689,047 B2
(45) Date of Patent: Jul. 21, 2026

(54) UNIQUE ELECTRODES FOR ELECTROCHEMICAL CELLS

(71) Applicant: Global Energy Science, LLC, Santa Barbara, CA (US)

(72) Inventor: Halbert P. Fischel, Las Vegas, NV (US)

(73) Assignee: Global Energy Science, LLC, Santa Barbara, CA (US)

( * ) Notice: Subject to any disclaimer, the term of this patent is extended or adjusted under 35 U.S.C. 154(b) by 941 days.

(21) Appl. No.: 17/844,326

(22) Filed: Jun. 20, 2022

(65) Prior Publication Data

US 2022/0320539 A1 Oct. 6, 2022

Related U.S. Application Data

(60) Continuation-in-part of application No. 16/730,210, filed on Dec. 30, 2019, now Pat. No. 11,469,430,
(Continued)

(51) Int. Cl.
*H01G 11/02* (2013.01)
*H01G 11/04* (2013.01)
(Continued)

(52) U.S. Cl.
CPC ........ *H01M 8/04283* (2013.01); *H01G 11/02* (2013.01); *H01G 11/04* (2013.01);
(Continued)

(58) Field of Classification Search
CPC . H01M 8/02–04291; H01M 8/08–086; H01M 8/18–184; H01M 8/24–2495;
(Continued)

(56) References Cited

U.S. PATENT DOCUMENTS 3,490,952 A 1/1970 Balaguer
3,930,094 A 12/1975 Sampson et al.
(Continued)

FOREIGN PATENT DOCUMENTS

CN 102306800 A 1/2012
DE 4207819 A1 9/1993
(Continued)

OTHER PUBLICATIONS

Machine translation of Katase, JP 2011151279. Originally available Aug. 4, 2011 (Year: 2011).*
(Continued)

*Primary Examiner* — Nicole M. Buie-Hatcher
*Assistant Examiner* — Jacob Buchanan
(74) *Attorney, Agent, or Firm* — Bachman & LaPointe, P.C.

(57) ABSTRACT

An electrode for electrochemical cells including an electrically conductive cohesive membrane having a thickness defined by a first surface and a second surface opposite the first surface; ohmic impedance independent of membrane thickness; simultaneous uniform charge/discharge throughout membrane thickness; the membrane comprising open cell pores and surfaces; a current collector electrically strongly coupled to the entire membrane thickness; and pins extending through the membrane from the first surface to the second surface; the pins electrically coupled to the current collector having eliminated prior art problematical interfacial layers.

21 Claims, 6 Drawing Sheets

Related U.S. Application Data which is a division of application No. 15/408,940, filed on Jan. 18, 2017, now Pat. No. 10,522,856, application No. 17/844,326 is a continuation-in-part of application No. 15/069,998, filed on Mar. 15, 2016, now Pat. No. 9,991,059, which is a division of application No. 14/717,139, filed on May 20, 2015, now Pat. No. 9,337,474.

(60) Provisional application No. 62/286,994, filed on Jan. 26, 2016, provisional application No. 62/086,836, filed on Dec. 30, 2014.

(51) Int. Cl.

| | |
|---|---|
| *H01G 11/24* | (2013.01) |
| *H01G 11/36* | (2013.01) |
| *H01G 11/70* | (2013.01) |
| *H01M 4/02* | (2006.01) |
| *H01M 4/133* | (2010.01) |
| *H01M 4/66* | (2006.01) |
| *H01M 4/74* | (2006.01) |
| *H01M 4/96* | (2006.01) |
| *H01M 8/00* | (2016.01) |
| *H01M 8/04276* | (2016.01) |
| *H01M 10/04* | (2006.01) |
| *H01G 11/46* | (2013.01) |

(52) U.S. Cl.
CPC ............ *H01G 11/24* (2013.01); *H01G 11/36* (2013.01); *H01G 11/70* (2013.01); *H01M 4/02* (2013.01); *H01M 4/133* (2013.01); *H01M 4/661* (2013.01); *H01M 4/747* (2013.01); *H01M 4/96* (2013.01); *H01M 8/004* (2013.01); *H01M 10/04* (2013.01); *H01G 11/46* (2013.01); *Y02E 60/13* (2013.01)

(58) Field of Classification Search
CPC ..... H01M 4/02–049; H01M 4/13–133; H01M 4/139; H01M 4/1393; H01M 4/24–30; H01M 4/62; H01M 4/624; H01M 4/64–80; H01M 4/86–8642; H01M 4/88–92; H01M 4/96; H01M 50/40–403; H01M 50/409–411; H01M 50/44; H01M 50/446–457; H01M 10/05–0525; H01G 11/02–12; H01G 11/22–40; H01G 11/52; H01G 9/04–042; H01G 9/048; H01G 9/155

See application file for complete search history.

(56) References Cited

U.S. PATENT DOCUMENTS

| | | | |
|---|---|---|---|
| 4,366,051 | A | 12/1982 | Fischel |
| 4,386,987 | A | 6/1983 | Covitch et al. |
| 5,034,135 | A | 7/1991 | Fischel |
| 5,234,778 | A | 8/1993 | Wright |
| 5,376,263 | A | 12/1994 | Fischel |
| 5,955,215 | A | 9/1999 | Kurzwell et al. |
| 6,099,987 | A | 8/2000 | Daniel-Ivad et al. |
| 7,955,535 | B2 | 6/2011 | Liang et al. |
| 7,964,301 | B2 | 6/2011 | Fischel et al. |
| 7,971,489 | B2 | 7/2011 | Pushparaj et al. |
| 7,972,747 | B2 | 7/2011 | Fischel |
| 8,017,261 | B2 | 9/2011 | Halbert |
| 8,021,747 | B2 | 9/2011 | Yi et al. |
| 8,124,296 | B1 | 2/2012 | Fischel |
| 8,147,767 | B2 | 4/2012 | Fischel |
| 8,158,277 | B1 | 4/2012 | Fischel |
| 8,173,217 | B2 | 5/2012 | Shin et al. |
| 8,187,560 | B2 | 5/2012 | Fischel |
| 8,187,737 | B2 | 5/2012 | Fischel |
| 8,213,157 | B2 | 7/2012 | Wei et al. |
| 8,283,062 | B2 | 10/2012 | Fischel |
| 8,283,275 | B2 | 10/2012 | Heo et al. |
| 8,333,810 | B1 | 12/2012 | Meyyappan |
| 8,394,518 | B2 | 3/2013 | Fischel et al. |
| 8,415,012 | B2 | 4/2013 | Zheng et al. |
| 8,703,355 | B2 | 4/2014 | Zhang et al. |
| 8,911,893 | B2 | 12/2014 | Suppes |
| 8,951,697 | B2 | 2/2015 | Zhang et al. |
| 9,337,474 | B1 * | 5/2016 | Fischel ................. H01G 11/26 |
| 9,508,976 | B2 | 11/2016 | Herle |
| 9,698,396 | B2 | 7/2017 | Lee et al. |
| 2001/0050234 | A1 | 12/2001 | Shiepe |
| 2002/0097549 | A1 | 7/2002 | Maletin et al. |
| 2002/0180094 | A1 | 12/2002 | Gough et al. |
| 2004/0058249 | A1 | 3/2004 | Cai et al. |
| 2005/0079409 | A1 | 4/2005 | Andelman et al. |
| 2005/0104243 | A1 | 5/2005 | Mercuri et al. |
| 2006/0172134 | A1 | 8/2006 | Ro et al. |
| 2007/0048594 | A1 | 3/2007 | Oh et al. |
| 2007/0148531 | A1 | 6/2007 | Yoshizawa et al. |
| 2008/0241685 | A1 | 10/2008 | Hinoki et al. |
| 2008/0288336 | A1 | 11/2008 | Charuk et al. |
| 2009/0136832 | A1 * | 5/2009 | Mitsuda .................. H01G 9/10 |
| | | | 429/94 |
| 2010/0086837 | A1 | 4/2010 | Asari et al. |
| 2010/0099029 | A1 * | 4/2010 | Kinoshita ......... H01M 10/0525 |
| | | | 429/316 |
| 2010/0119932 | A1 | 5/2010 | Nakura et al. |
| 2010/0178543 | A1 | 7/2010 | Gruner et al. |
| 2011/0123866 | A1 | 5/2011 | Pan et al. |
| 2012/0082873 | A1 | 4/2012 | Fischel |
| 2012/0193242 | A1 | 8/2012 | Marchal |
| 2013/0017432 | A1 | 1/2013 | Roumi |
| 2013/0045413 | A1 | 2/2013 | Wang et al. |
| 2014/0317920 | A1 * | 10/2014 | Vanderleeden ..... H01M 8/0267 |
| | | | 29/852 |
| 2015/0104714 | A1 | 4/2015 | Galande et al. |
| 2016/0204408 | A1 | 7/2016 | Herle |
| 2016/0240326 | A1 | 8/2016 | Fischel |
| 2017/0047591 | A1 | 2/2017 | Fischel |
| 2017/0062787 | A1 | 3/2017 | Fischel |
| 2017/0125829 | A1 * | 5/2017 | Fischel .................. H01G 11/70 |
| 2017/0173728 | A1 | 6/2017 | Fischel |
| 2020/0052276 | A1 * | 2/2020 | Song ....................... H01M 4/13 |

FOREIGN PATENT DOCUMENTS

| | | | | | |
|---|---|---|---|---|---|
| JP | 2011151279 | A | * | 8/2011 | ............ H01M 4/133 |
| JP | 2015524991 | A | | 8/2015 | |
| KR | 20140048197 | A | | 4/2014 | |
| WO | WO-9959218 | A1 | * | 11/1999 | .......... H01M 10/052 |
| WO | 2007039726 | A1 | | 4/2007 | |
| WO | 2011137239 | A1 | | 11/2011 | |
| WO | WO-2019004655 | A1 | * | 1/2019 | .......... H01M 10/052 |

OTHER PUBLICATIONS

Laurencelle, F. et al., "Characterization of a Ballard MK5-E Proton Exchange Membrane Fuel Cell Stack", Fuel Cells, 1(1) , 2001, pp. 66-71.

Kim, J., Lee S-M., Srinivasan S. and Chamberlin C.E., (1995), "Modeling of Proton Exchange Membrane Fuel Cell Performance with an Empirical Equation", Journal of the Electrochemical Society, vol. 142(8), pp. 2670-2674.

Koper, M., Ed., Fuel Cell Catalysis, Wiley (2009), Chapter 3, p. 70.

Newman, J., et al., "Electrochemical Systems" Wiley (2004), Chapter 22 and Table 11.1, p. 284.

Bagotsky, V.S., "Fundamentals of Electrochemistry", Wiley (2006), Chapter 4.4, pp. 60-61.

Conway, B.E., "Electrochemical Supercapacitors", Plenum (1999), Chapters 16, 17.

Gordon, M. and Suppes, G., "Convection Battery-Modeling, Insight, and Review", AIChE Journal, Aug. 18, 2013, vol. 59, No. 8, pp. 2833-2843.

(56)          References Cited

OTHER PUBLICATIONS

Sassin, M. B. et al., "Redox Deposition of Nanoscale Metal Oxides on Carbon for Next-Generation Electrochemical Capacitors", Accounts of Chemical Research (2013), vol. 46, No. 5, pp. 1062-1074.

Chung, H. T., et al., "Active and Stable Carbon Nanotube/Nanoparticle Composite Electrocatalyst for Oxygen Reduction", Nature Communications, May 28, 2013.

Gorlin, Y., and Jaramillo, T.F., A Bifunctional Nonprecious Metal Catalyst for Oxygen Reduction and Water Oxidation, JACS Communications, Sep. 14, 2010.

Wang, H., et al., "An Ultrafast Nickel-Iron Battery from Strongly Coupled Inorganic Nanoparticle/Nanocarbon Hybrid Materials", Nature Communications, Jun. 26, 2012.

Zou, X. et al., "Cobalt Embedded Nitrogen-Rich Nanotubes Efficiently Catalyze Hydrogen Evolution Reaction at All pH Values**"" Angewandte Chemie, (2014), 126, pp. 4461-4465.and Supporting Information.

Ma, X., et al., High Rate Micrometer Ordered LiNi0.5Mn1.504, Journal of The Electrochemical Society (2010), 157(8), pp. A925-A931.

Bockris, J, O. et al., Modern Electrochemistry, 2nd Edition, Kluwer Academic/Plenum, Chapter 13.5, pp. 1812-1813. (2000).

Evanoff, K. et al., "Ultra Strong Silicon-Coated Carbon Nanotube Nonwoven Fabric as a Multifunctional Lithium-Ion Battery Anode", American Chemical Society Oct. 17, 2012, vol. 6, No. 11, pp. 9837-9845.

International Search Report dated May 24, 2018 for patent application PCT/US2017/066558.

International Search Report dated Dec. 22, 2017 for patent application PCT/US2017/051739.

International Search Report dated Feb. 22, 2018 for patent application PCT/US2017/060278.

Goodenough, J et al., "The Li-Ion Rechargeable Battery: A Perspective", Journal of the American Chemical Society, 2013,135 (4), pp. 1167-1176.

Gaberscek M et al., "The Importance of Interphase Contacts in Li Ion Electrodes: The Meaning of the High-Frequency Impedance Arc", Electrochemical and Solid State Letter (2008), vol. 11, pp. A170-A174.

Muenzel, V. et al. , "A Comparative Testing Study of Commercial 18650-Format Lithium-ion Battery Cells", Journal. ECS (2015), vol. 162, (8) pp. A1592-A1600.

* cited by examiner

UNIQUE ELECTRODES FOR ELECTROCHEMICAL CELLS

CROSS-REFERENCE TO RELATED APPLICATIONS

This application is a continuation-in-part of U.S. patent application Ser. No. 16/730,210 filed Dec. 30, 2019 which is a Divisional of U.S. patent application Ser. No. 15/408,940, filed Jan. 18, 2017, now U.S. Pat. No. 10, 522, 856, the disclosure of which is incorporated by reference herein in its entirety as if set forth at length, which claims benefit to U.S. Patent Application No. 62/286,994, filed Jan. 26, 2016, the disclosure of which is incorporated by reference herein in its entirety as if set forth at length and this is a Continuation-In-Part of U.S. application Ser. No. 15/069,998, filed Mar. 15, 2016, now U.S. Pat. No. 9,991,059, which is a divisional of U.S. application Ser. No. 14/717,139, filed May 20, 2015, now U.S. Pat. No. 9,337,474, which claims the benefit of U.S. Patent Application No. 62/086,836, filed Dec. 3, 2014, and which is also incorporated herein by reference.

BACKGROUND

The present disclosure is directed to galvanic electrochemical cells that produce DC electricity from chemically stored energy received as electricity or fuel oxidation in cells employing dielectric electrolyte comprising at least one of; stationary liquid, circulating liquid and solid. Rechargeable (secondary) batteries, electronic double layer capacitors (EDLC) and fuel cells are disclosed examples.

In order to function as electrodes in electrochemical cells galvanic membranes (freestanding) or pellicles (skin adjacent metal surface) must be porous by virtue of a contiguous open pore structure of electrical current conducting material(s) wherein empty volume is used to contain electrolyte and accommodate particles and/or molecules that interact with electrolyte to produce electrical current. Note that particles or molecules must simultaneously interact with electrical conductors on the one hand and dielectric electrolyte on the other to produce and support electrical current. Prior solutions favor one function or the other.

The polar terminal of a cell communicates with its electrode through an electrically conductive metallic pathway that includes a 'current collector' (CC). Irrespective of any design or detail of CC components the path ends at an essentially two dimension 2-D metal surface even if prior art three dimension 3-D morphology is embedded in CC surfaces with applied pressure to enhance electrical charge transfer from electrode chemistry to a current collecting surface. For example, a negative valence 'anode' can be understood as a secondary rechargeable galvanic membrane that overlays and is expected to exchange electrons (flowing out at discharge, inward while charging) with that surface. The combination is referred to in the art as a Membrane Electrode Assembly (MEA). Electrons flow in an opposite direction at the positive cathode. Membranes can be cohesive freestanding or more molecularly attached to a metal surface as a 'skin' that are actually pellicles. However, due to an obligatory presence of an interfacial layer of electrolyte or at least a microscopic gap wherein either or both cannot be avoided, whether solid or liquid, the pellicle definition virtually never applies to electrical attachment in prior art. In actual fact, heretofore, there is always ohmic resistance to the flow of electrons in the interface between a metal surface and overlying membrane which produces current collection heat, $i^2R$ where i is area specific electrical current density and R is Ohm·cm$^2$ representing Ohmic resistance.

Alkali metal batteries, e.g. Li may use metal wafer anodes for compact energy storage that may have an improved connection to CC metal but that anode structure has limited access to electrolyte.

A similar description applies to the positive terminal or cathode with some differences relevant to Lithium Ion Battery (LIB). Most embodiments use nanoscale carbon powder, e.g. Printex™ with binder as a charge transfer medium. The main difficulty remains poor "wiring" of charge producing chemistry to CC metal in battery or fuel cell electrodes. Electrically conductive powders cannot form a free standing cohesive membrane. Rather, they aggregate and poorly distribute around active chemistry particles. More importantly as with anodes they coat metal CC surfaces through electrolyte interface barriers. Such coatings are 'brushed' onto CC metal as MEA membrane electrode assemblies or embedded in polymer electrolyte membranes (PEM). Either produces high specific area electrode ohmic resistance, R ohm-cm$^2$. There have been recent moves away from the description above, although it remains ubiquitous in the marketplace.

SUMMARY

In accordance with the present disclosure, there is provided an electrode for electrochemical cells comprising an electrically conductive cohesive membrane having a thickness defined by a first surface and a second surface opposite the first surface; the membrane comprising interior open cell pores and surfaces; a current collector electrically coupled to pins (wires) extending through the membrane from the first surface to the second surface; the pins electrically coupled to the current collector.

A further embodiment of any of the foregoing embodiments may additionally and/or alternatively include the membrane comprises one of a nanoscale contiguous open cell pore structure and a mesoscopic contiguous open cell pore structure.

A further embodiment of any of the foregoing embodiments may additionally and/or alternatively include metal pins saturate the membrane open cell pores and surfaces in the absence of tearing, piercing nor displacing the first surface and the second surface and the interior contiguous open cell structure of the membrane.

A further embodiment of any of the foregoing embodiments may additionally and/or alternatively include each of the pins extend substantially orthogonal from the current collector.

A further embodiment of any of the foregoing embodiments may additionally and/or alternatively include the first surface is substantially parallel to the current collector and the second surface is substantially parallel to the current collector.

A further embodiment of any of the foregoing embodiments may additionally and/or alternatively include the electrode for electrochemical cells further comprising a gap formed between the first surface and the current collector.

A further embodiment of any of the foregoing embodiments may additionally and/or alternatively include the first surface is adjacent to the current collector.

A further embodiment of any of the foregoing embodiments may additionally and/or alternatively include at least one of the pins having a length to enclosing diameter aspect ratio in the range of 2/1 to 10/1 and ideally 5/1.

A further embodiment of any of the foregoing embodiments may additionally and/or alternatively include a bare metal surface of at least one of; the current collector and pins otherwise exposed to electrolyte is coated with a polymer dielectric.

In accordance with the present disclosure, there is provided an electrochemical unit cell comprising a positive electrode and a negative electrode separated by at least one of a separator and a gap filled with dielectric electrolyte; each of the positive electrode and the negative electrode including a galvanic or electrolytic membrane comprising an electrically conducting contiguous open cell porous membrane support structure saturated by electrolyte and faradaic or catalyst materials; the galvanic membrane having a thickness defined by a first surface and a second surface opposite the first surface; a current collector proximate to the first surface; and pins extending through the membrane from the first surface to the second surface; the pins electrically coupled to the current collector.

A further embodiment of any of the foregoing embodiments may additionally and/or alternatively include the separator is selected from the group consisting of an electrolyte/ion permeable dielectric and polymer electrolyte membrane.

A further embodiment of any of the foregoing embodiments may additionally and/or alternatively include the pins saturate the open cell porous membrane support structure.

A further embodiment of any of the foregoing embodiments may additionally and/or alternatively include the pins include a pin base proximate the current collector and a pin top located opposite the pin base proximate the separator.

A further embodiment of any of the foregoing embodiments may additionally and/or alternatively include the current collector electrically couples the pins.

A further embodiment of any of the foregoing embodiments may additionally and/or alternatively include the galvanic membrane within the pin is saturated only with pin material comprising at least one of metal and electrically conductive material.

In accordance with the present disclosure, there is provided a process for forming an electrode for an electrochemical unit cell comprising providing an electrically conductive cohesive galvanic membrane having a thickness defined by a first surface and a second surface opposite the first surface; the galvanic membrane comprising open cell pores and surfaces; electrically coupling a current collector to the first surface; and forming pins extending through the galvanic membrane from the first surface to the second surface; and electrically coupling the pins to the current collector.

A further embodiment of any of the foregoing embodiments may additionally and/or alternatively include the galvanic membrane comprises one of a nanoscale contiguous open cell pore structure and a mesoscopic contiguous open cell pore structure.

A further embodiment of any of the foregoing embodiments may additionally and/or alternatively include the pins saturate the galvanic membrane open cell pores and surfaces in the absence of tearing, piercing nor displacing the first surface and the second surface and the interior porous structure of the membrane.

A further embodiment of any of the foregoing embodiments may additionally and/or alternatively include the galvanic membrane within the pin is saturated only with pin material. The contiguous open cell porous membrane is NOT galvanic 'within' the pin as it contains no electrolyte or faradaic material within the pin. Outside the pin it is 'galvanic'.

A further embodiment of any of the foregoing embodiments may additionally and/or alternatively include the galvanic membrane contiguous open cell native porous structure within the pin is saturated only with pin metal to the exclusion of electrolyte and any other material.

A further embodiment of any of the foregoing embodiments may additionally and/or alternatively include a membrane contiguous open cell porous structure understood to comprise an electrically conducting backbone or skeleton defined by conducting surfaces of carbon or metal that transects the pin without alteration of its structure.

A further embodiment of any of the foregoing embodiments may additionally and/or alternatively include the process further comprising electrically coupling the pins with the current collector.

A further embodiment of any of the foregoing embodiments may additionally and/or alternatively include the process further comprising forming a gap between the first surface and the current collector.

A further embodiment of any of the foregoing embodiments may additionally and/or alternatively include the galvanic membrane containing a support structure that passes unaltered through the pin with which the galvanic membrane makes unimpeded metallic contact while the galvanic membrane provides rigidity and strength to the pin.

The disclosure includes an electrode for electrochemical cells comprising; an electrically conductive cohesive membrane having thickness defined by parallel 1st and 2nd surfaces wherein; the membrane comprises at least one of; nanoscale and mesoscopic contiguous open cell pores and surfaces. The membrane 1st surface faces toward and is parallel to the metal surface of a current collector, wherein the membrane 1st surface is one of; adjacent to and displaced from the metal surface of the current collector.

The membrane is understood to comprise an electrically conducting 'backbone' or 'skeleton' that forms a contiguous open cell porous structure defined by conducting surfaces of carbon or metal. Carbon nanotubes, CNT (buckypaper) and carbon nanofoam, CNF are examples. Pt nanofoam is possible but expensive for little if any practical advantage.

Individual substantially uniform diameter metal wires extend orthogonally from each wire's electrical connection to the current collector's metal surface and terminate at the 2nd surface of the membrane. Nevertheless, individual wire metal 'pins' fully saturate membrane pores but do not tear, pierce nor otherwise displace membrane surfaces. Wire metal pins encapsulate the carbon or metal membrane conducting backbone but exclude all other electrode material including electrolyte and chemical components.

Added faradaic and/or catalytic materials are strongly electrically coupled to cohesive freestanding membrane surfaces that are thereby a galvanic membrane, GM except where the membrane obtains within metal wires. Solid, liquid or gel type electrolyte, fill membrane pores but cannot enter into wire (pin) metal. Rather, membrane contiguous surfaces are strongly electrically coupled to wire metal.

Wire orthogonal attachment to a CC surface is in accordance with a strict pattern. The most efficient pattern is hexagonal with a wire located at each corner and one at the hexagon's center to become a 60° isosceles tile pattern where every wire is equidistant from all closest surrounding wires. Wires at the corners of squares will do but requires more wires because the controlling principle of wire location requires that no location within a GM can be further from a nearest wire than 3 times the thickness of the GM.

The issue addressed by the instant disclosure is how a galvanic membrane can best be attached to a CC surface across an obligatory electrolyte interface in a real battery/ capacitor or some other dielectric gap required in fuel cells with the lowest possible ohmic resistance. The problem was both mathematically and effectively solved per claim 1 of U.S. Pat. No. 10,038,197 B2 issued to this inventor dated Jul. 31, 2018.

However, that is not the best in some circumstances or even a suitable choice for fuel cells where the gap between galvanic membrane and CC may be filled with gas, fuel and electrolyte. The problem is now solved by extending the concept of the above cited patent with virtually the same galvanic membrane structures and attachment logic but without applied pressure or any of the various forms and methods of attachment cited therein. Attachment then and as well herein continues to mean the aggregate attached area is a negligible fraction of membrane facial area (in this case less than 3%) but remains distributed among discrete locations in order that no unattached area is further from an attached area by more than 3 times membrane thickness.

Galvanic membranes, like common papers, have a definable, largely uniform thickness, first and second separated essentially parallel surfaces, and a perimeter that defines an area. There will be a first surface facing but not necessarily adjacent the CC surface. The second membrane surface therefore faces away from the CC surface. There is no need as in the cited patent claim #1 to define vectors. Nevertheless, it is useful to note that planar galvanic membranes have high normal vector resistance as measured through the membrane. It is an order of magnitude less within the plane of the paper. That is what mathematically determines attachment spacing as herein specified.

The disclosure can be described as follows. Applicable galvanic membrane material may include any cohesive electrically conductive network, 'paper' with at least 100 Scm$^{-1}$ (Siemen/cm) in-plane electrical conductivity, i.e., 0.01 Ω-cm resistivity and 1 Mpa dry or wet tensile strength as cited in the above Fischel patent, e.g. non-woven carbon nanotubes, CNT, i.e., 'buckypaper.' Galvanic membranes may further include nanowire or nanorods of any metal, e.g., W, Ti, Ni formable into paper sheets similar to buckypaper. Contiguous open cell porous electrically conducting foams, e.g. carbon nanofoam, are included as eligible papers. Fibrous papers may be woven or nonwoven. All these 'papers,' possess very large collective surface area capable of bonding to and strongly coupling electrically to faradaic and/or catalytic particles and molecules. Alkali metal cathode particles, i.e. Li, may be an exception to that rule and will be otherwise secured within said papers.

The disclosure consists in the following description of an electrical connection of, respectively, positive and negative galvanic membranes to a preferably but not necessarily, flat 2-D CC surface that will comprise a new type of MEA. It begins by locating a first surface of a galvanic membrane at one of; adjacent to and spaced apart from the CC surface wherein area perimeters of each component will make the CC slightly larger or co-terminal with the GM so as to share orthogonally projected common surface area. In all descriptions to follow the first surface of a GM faces the CC surface. Rising vertically (locally orthogonal) from the CC surface is a pattern of metallic (e.g.; metal identical to the CC) villi, each resembling a pin or short wire having small area cross section and metallically attached to the CC surface at their respective bases contiguously with CC metal. The height of each 'pin' is sufficient to reach past the first surface of the GM, even if that first membrane surface is spaced away from the CC surface, and to the membrane's second surface.

It is important to note that, for purposes of this disclosure, metal pins neither pierce, displace nor tear the GM even as they exist within its porous structure. Rather, pin metal fills a small portion of collective GM open pore volume in accordance with the prescribed pattern. Although GM carbon or other chosen conductive structure contains electrolyte and faradaic material within its contiguous open pores, those materials do not obtain within pin volume. The term "obtain" used herein refers to something, material or phenomena that exists, can exist or temporarily exists in a certain place, location or time.

What is intended in this disclosure is that both electrolyte (liquid or solid) and faradaic, catalytic or any other participating 'chemistry' producing electrochemical reactions cannot enter into or ever exist within the multiple metal "pins," i.e., metal electrical conductors that begin at their individual bases materially and electrically connected to the surface of the current collector that communicates with cell terminals and extend to pass through the first surface of the Galvanic Membrane and through the contiguous open pores of the, e.g.; carbon "backbone" of the membrane and terminate at an opposite surface of that membrane. As this pin metal is created within the carbon pores of the membrane it plates onto the surfaces of those otherwise naked pore surfaces with 'metallic' attachment. It does not disturb the pore structure. Therefore, there cannot be a dielectric interfacial layer between carbon and metal to cause electrical resistance and other known problems of degradation in LIB or any other type electrochemical cell.

Clearly, at least part of the pin (villi-wire) appears to occupy the same space as the galvanic membrane. The manner of that duality deserves explanation and is an important part of this disclosure. Porous conductive material comprising the GM backbone prior to filling with electrolyte and faradaics/catalyst, are cohesive non-woven carbon nanotubes, nanofoam and metallic or carbon fiber structures which, by themselves can be 75% to 80% empty volume or only 20% empty volume. Outside the pin/wire metal volume GM pores contain electrolyte and faradic/catalytic material that mutually interact with fibers or contiguous open pore foam structures to generate electrical current that travels along the now fully described electrically conductive material (ECM) which further comprises the cohesive backbone of a GM. Not all ECM reach a metal pin but measured GM in-plane electrical conductivity can be understood to mean that all ECM is in mutual electrical communication. The unprecedented and unique concept this disclosure is intended to convey is that the ECM structure is continuous and unaltered throughout the GM both inside and outside the metal pins. Inside the pin metal volume, contiguous open ECM pores contain only pin metal to the total exclusion of electrolyte and faradaic materials. Those materials obtain only within ECM structures outside the pins.

Inside the pins metal fills ECM pores to saturation and to fully encase, strongly couple and connect electrically to otherwise undisturbed ECM surfaces. That can be understood to mean all electrical current generated on or in any ECM surface anywhere within a GM outside wire pins can fully transfer charge with its own inherent in-plane ohmic resistance obtaining along its path to the nearest pins. Thereafter, electric charge exchange with pin metal and the CC is with virtually zero resistance as the conduction pathway is from ECM contact with pin metal, through pin metal and to the CC which is fully metallic.

Current carrying ECM is negligibly altered as it fully transects pin metal and is as densely populated within the pin as it is outside the pin; approximately 20% or 25% by volume in most cases or to 80% in special EDLC supercapacitor cases. Contrary to weakening the pin/wire as one might suspect, the pin is actually strengthened like rebar embedded in concrete. It is understood that electrolyte, faradaic particles and catalysts can neither penetrate nor enter into pin metal to form any dielectric layer or otherwise interfere with the electrical connection of ECM to pin metal and through that path, metallically to the CC.

It is possible to arrange multiple pin locations in any pattern that satisfies claim 1 of the Fischel patent cited above, namely that no point within the GM can be further from a pin than three times the thickness of the GM. By arranging pins in the most efficient or hexagonal pattern it is possible to satisfy the claimed elements with the fewest number of pins. Ultralow resistance charge transfer for the electrode as a whole is possible when pins have a collective cross sectional area of ≈3% of total GM facial area. That amounts to a minimal energy storage capacity loss for orders of magnitude improvement in electrical conductivity of the galvanic cell as a whole. Given typical prior art energy loss of >10% to ≈50% because of $i^2R$ heating in many prior examples, it is an attractive trade. Pin height can be greater than GM thickness if the membrane is spaced away from the CC surface. The gap neither subtracts nor contributes anything to electric charge transfer current in this invention but it is very useful in fuel cells for porting and distributing fuel and electrolyte both at entry and exhaust.

CC metal is usually Cu or Al in batteries but can be Ni or stainless steel (SS) passivated with NiO in fuel cells. Pins are actually connecting wires commonly used in multilayer microcircuits and memory chips. Many spaced apart pins arranged in a hexagonal pattern, as seen in FIG. 1, resemble a villiform structure. But they do not exist in this invention independently of being incorporated within the GM structure as described above. Pin height can be up to 10 times its average diameter for stability but does not have to be circular or uniform in cross section. GM from 50 μm to 500 μm thickness would be common in this application but 1mm is not beyond its scope. The smallest pin diameter is probably ≈40 μm on spaced apart intervals of 200 μm. It is noted and should be understood when designing electrochemical cells using electrodes of this disclosure; electrical resistance is, for the first time, entirely independent of electrode or membrane thickness. An already micro-ohmic resistance only gets lower as thicker membranes are employed for greater capacity or energy storage and for fuel cells, more complete fuel oxidation.

A particular benefit that accrues to the embedded pin/GM structure as herein described is exceptional dimensional stability in the presence of a large variety of electrolytes, e.g. liquid, gel or solid, with or without a separating semipermeable membrane that obtains in most prior electrochemical cells with a possible exception for solid electrolyte.

In some, but not all cases, the latter being dielectric may prevent short circuit between anode and cathode interfaces. A separating membrane prevents such a short circuit but at best slows the requisite exchange of ions between electrodes for batteries and fuel cells. Each electrode in accordance with this invention has a GM second surface facing its opposite member across a gap wherein said surfaces are held firmly in place by closely spaced structural pins. As in no other prior art, the entire GM retains structural and dimensional integrity throughout its volume owing to the reinforcing nature of metal bonding within pins irrespective of most chemical and thermal influences that may arise.

Consequently, the possibility of facing GM second surfaces moving significantly toward one another across a small gap comparable to the thickness of but without a separating membrane may remain under some conditions but is otherwise extremely unlikely heretofore. Not only is ion mobility enhanced thereby, mobile electrolyte becomes possible. Bagotsky provides an expression showing 1 cm/sec electrolyte convection accelerates mass transfer by at least 3 orders of magnitude compared to diffusion; ostensibly to increase an electrode's area specific current density. Bagotsky, V. S., Fundamentals Of Electrochemistry, Wiley (2006) Ch. 4.4, Pages 60-61.

A most effective procedure for constructing a complete electrode is to first fabricate the ECM/pin attachment to a CC. Installing faradaic and/or catalyst material strongly coupled to ECM is more convenient when the substrate is available as an electrode. Any chemistry, deposition, plating or other treatment required to bond and/or otherwise attach molecules to ECM, independent of electrochemical cell electrolyte, is readily implemented. It is the latter step that converts the ECM membrane to a fully qualified GM. The one exception to this otherwise fairly universal rule is incorporating LIB cathode particles uniformly into ECM structure. That becomes easier to do when fabricating the composite electrode with CC/pins, ECM and cathode particles, e.g. Li—FePO$_4$, Li—MnO$_2$, LiCoO$_2$, etc. simultaneously. Higher than ordinary concentrations of these materials can be achieved and locked in place by adding solid electrolyte afterwards. They are bound by ECM but not strongly electrically coupled to it. Chemical and other deposition processes may improve on that in the future which can only be aided by the above described method of binding within a cathode.

The disclosure can be used to benefit performance of electrochemical cells in general. Primary examples in this disclosure refer to commercially valuable battery types, fuel cells and super capacitors. A concept, never fully explored in prior art addresses and eliminates problematical interfacial layers that otherwise exist between the several components of present electrochemical cells. It is within even microscopic or thicker such layers that ohmic resistance, dendrites and SEI solid-electrolyte-interphase degrades cell performance and limits cycling ability. As presented hereinafter, both anode and cathode electrodes of virtually any electrochemical cell can be stabilized by fully eliminating these layers where they can add resistance to the flow of electrical current, cause short circuit, slow the chemical process or otherwise limit recyclability by virtue of material degradation.

Other details of the ultralow ohmic resistance electrode for electrochemical cells are set forth in the following detailed description and the accompanying drawings wherein like reference numerals depict like elements.

DETAILED DESCRIPTION

Figure 1:
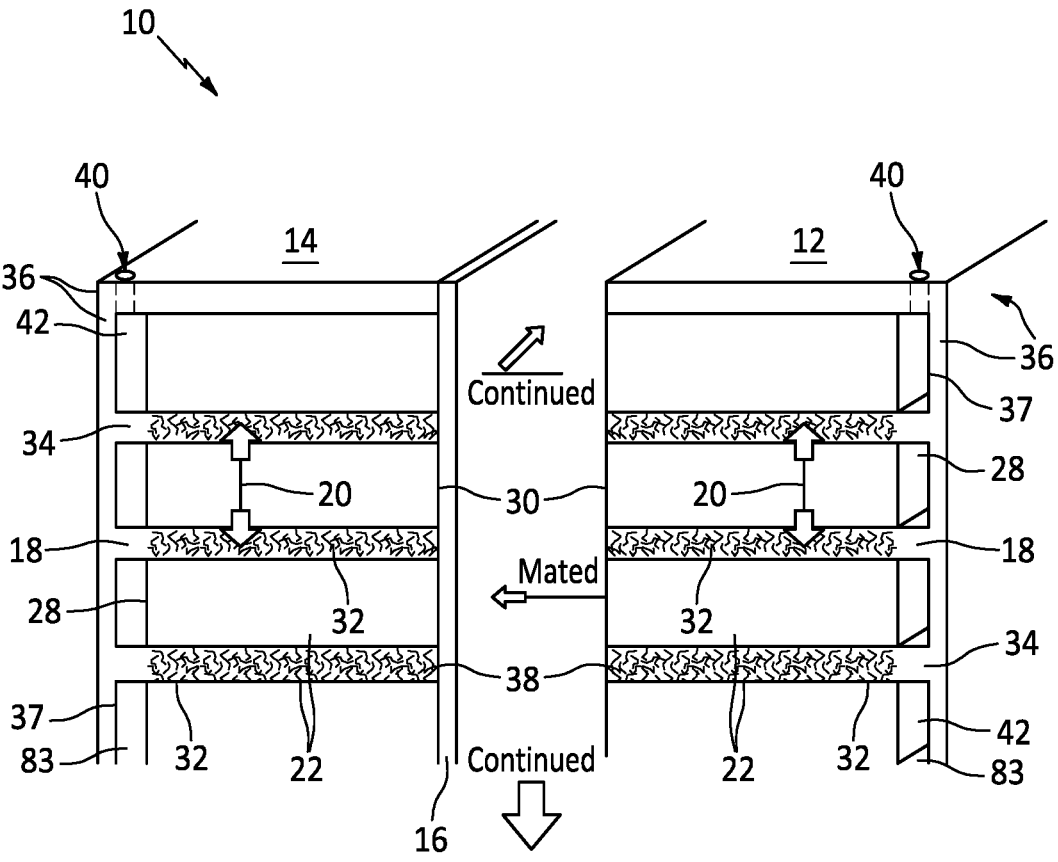
FIG. 1 is an expanded view schematic representation of an exemplary electrochemical unit cell.

Referring to FIGS. 1-6, FIG. 1 illustrates a symmetrical sectional view of an exemplary electrochemical unit cell 10. The cell 10 operates as at least one of; a galvanic cell (e.g., battery, fuel cell or EDLC) to include a negative electrode (anode) 12 and a positive electrode 14 (cathode) and an electrolytic cell (e.g., electrolysis) to include a positive electrode (anode) 12 and a negative electrode (cathode) 14 separated in some, but not all cases, by electrolyte/ion permeable dielectric or polymer electrolyte membrane (PEM) separator 16. In some cases e.g., solid electrolyte, the membrane separator 16 is omitted. The sectional view cuts through multiple metal pins 18 each comprising metallic extensions of CC metal 36 in the same plane but separated by a prescribed spacing 20. It also cuts through the singular unbroken electrically conductive porous membrane filling both 22 and 32 volumes to serve as a continuous cohesive high surface density skeletal structure (see FIG. 4a-4d) to enable galvanic membrane (GM) 22 and conductive pin metal 32 to function as intended. Current collector 36 comprises a finite, preferably thin sheet metal thickness having surface 37 displaced from GM first surface 28 by gap 42 of any width including 0. Irrespective of gap width 42, CC surface 37 is coated by an attached micro-thin (≈1 μm) layer of solid polymer dielectric 83. Metal pins 18 pierce polymer 83 which may also extend only so far as to cover pin bases 34. A GM is a porous skeletal membrane structure containing electrolyte and faradaic or catalytic materials. A single skeletal membrane structure separately fills polar electrodes 12 and 14 from membrane $1^{st}$ surface 28 to membrane $2^{nd}$ surface 30 with nanoscale contiguous open pores and surfaces. The membrane comprises open cell pores and pore surfaces 32. In accordance with this invention and of particular importance to its understanding, there is no discontinuity respecting the porous membrane support structure, 'skeleton' whether inside or outside metal pins 18. It is stated here as fact without precedent, inside pin volume, membrane pores and surfaces are saturated only with pin metal in total absence of electrolyte and faradaic or catalytic chemistry or their associated problematical interfacial layers. GM chemistry can only saturate membrane pores and surfaces outside of metal pins. For visual clarity, patterning indicating membrane support structure is shown within the corresponding volume of pins 18. The same pattern, if shown filling the entire space from the location of vertical line 28 to vertical line 30 would obscure what is unique about this invention. GM 22, containing electrolyte and faradaic and catalytic material, is shown as white. The same membrane skeletal structure continues unaltered within all pins whereby pin metal saturates its pores and electrically coats its surfaces to serve as an electrical conductor with unprecedented low ohmic resistance. A galvanic membrane (GM) 22 is an electrically conducting contiguous open cell porous membrane support structure saturated by electrolyte 24 and faradaic or catalyst materials 26. Only the galvanic membrane 22 support structure passes virtually unaltered through the metal wire/pin material 18 with which the galvanic membrane 22 makes unimpeded metallic contact while the galvanic membrane 22 contributes rigidity and strength to the pin 18. The pin material 18 comprises at least one of metal and electrically conductive material. The galvanic membrane 22 includes a first galvanic membrane surface 28 and a second galvanic membrane surface 30 opposite the first galvanic membrane surface 28. The galvanic membrane 22 includes membrane pores 32 distributed throughout the galvanic membrane 22. The metal pins 18 saturate the membrane pores 32. The metal pins 18 can optionally include a metal pin base 34 that contains no skeletal membrane material being solid metal commensurate with the width of the optional clear open space gap 42 proximate a current collector 36. The current collector 36 can comprise metal material or other current conducting materials. The current collector 36 electrically couples the metal pins 18. A metal pin top 38 is located opposite the metal pin base 34. The metal pin top 38 is proximate the separator 16. The metal pin base 34 is located proximate the current collector 36. A port 40 can be formed through the current collector 36. A gap 42 can be formed between the current collector 36 and galvanic membrane 22.

Figure 2:
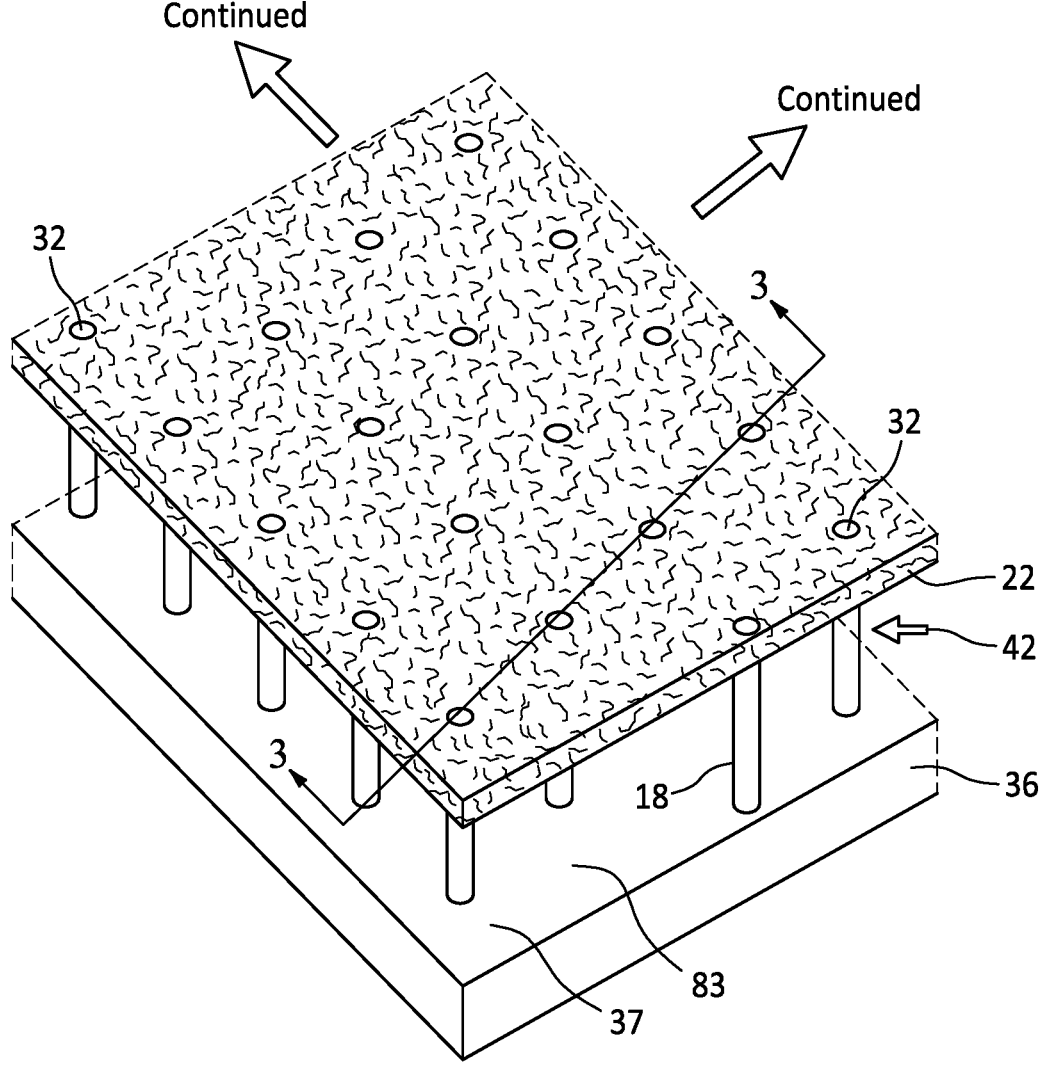
FIG. 2 is a schematic oblique isometric representation of a GM connected to a CC by way of pins.

FIG. 2 illustrates the manner in which the galvanic membrane 22 is physically and electrically connected in this invention to current collectors 36, understood as essential components in virtually all electrochemical cells 10. Terminals in these cells are metallically connected to current collectors 36 with minimum possible ohmic resistance. Heretofore, connecting cell electric current producing GM chemistry 22 to current collectors 36 has been a persistent obstacle because of dielectric/electrolyte interfacial layers and ohmic resistances that limit electrode area specific current density, i to low values and require large area spiral or prismatic architecture. By contrast FIG. 2 shows how current collectors 36 can be connected with several orders of magnitude higher current density owing to similarly reduced electrical resistance through multiple properly spaced pins 18 in accordance with this and prior related patents to the same inventor. In-plane low resistance electrical conduction paths are confined to surfaces defined by carbon or metal open cell contiguous pores that enter pins carrying no electrolyte or chemistry related to the faradaic activity of the electrochemical cell. Space 42 is, at a minimum, the thickness of a polymer dielectric coating 83, ≈1 to 2 μm and covers the entirety of CC surface 37 as well as the surface of pins 18 not embedded within GM 22. It is counterintuitive to coat a CC with dielectric to prevent electrical current from reaching it but that is exactly the current that leads to dendrites, SEI and chemical degradation limiting cell life and charge cycling. As here described, it is not possible for problematical interfacial layers to exist anywhere within electrochemical cells in accordance with the disclosure.

Figure 3:
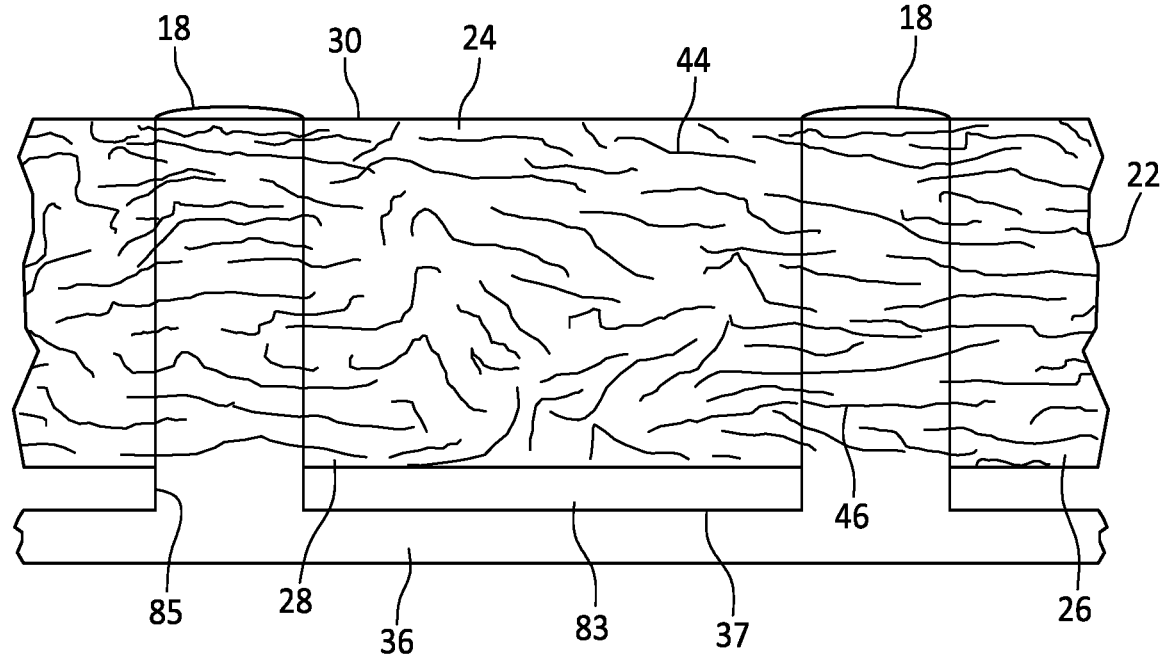
FIG. 3 is a schematic representation of a sectional view of the exemplary electrochemical cell of FIG. 2.
Figure 4:
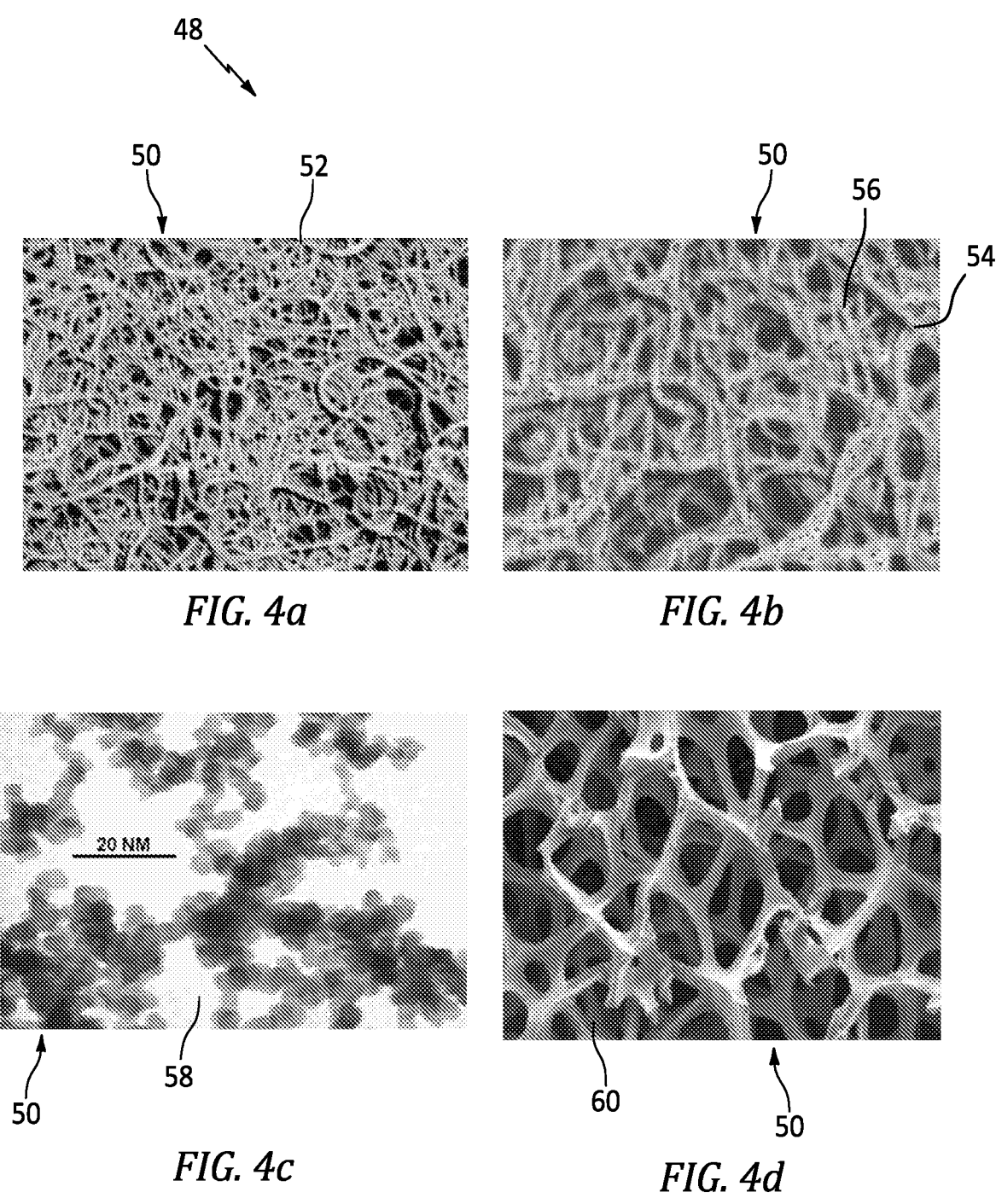
FIGS. 4a-4d are schematic representations of a variety of exemplary open cell porous structures.

FIG. 3 illustrates a sectional view of cut 3-3 of FIG. 2 through two closest pins 18 to show how the character of the contiguous open pore skeletal backbone of GM membrane 22, located between first and second surfaces 28 and 30, changes from containing galvanic material and electrolyte 24 between pins 18, to containing only porous carbon nanotubes (CNT) 46, i.e., comprising membrane 22 open pore 'backbone' material saturated with pin metal within the volume of pin metal 18. Some of the CNT fibers 44 that participate in forming the GM portion of membrane 22 contact, partially enter or fully transect, the pin 18, e.g., 46. In effect, membrane 22 within the pin 18 is saturated only with pin metal. Exterior of the pin 18 galvanic membrane 22 is saturated with electrolyte 24 and faradaic materials 26 that, respectively, fill and coat pores and surfaces of CNT 44. In brief, the continuity of a membrane electrically conductive porous skeletal backbone is never broken throughout an electrode from surface 28 to surface 30. It is exclusively saturated by galvanic materials and electrolyte between the pins and exclusively by metal within the pins. Furthermore, CC metal surface 37 is coated with a thin (1-2 μm) layer of polymer dielectric 83 to block electrical leakage current from reaching metal CC, thus preventing the formation of corrosive interfacial layers. The same applies to such coating over otherwise exposed bases 85 of pins 18.

FIG. 4a-4d illustrates a variety of open cell porous structures 48. Structure pores are cohesively formed by walls, connected particles or nonwoven fibers wherein walls, particles and fibers have defined surfaces. Faradaic chemistry and electrolyte attaches to said surfaces outside of pin volumes. Inside of pin volumes only metal attaches to said surfaces absent any interfacial layer. Among all of the various currently available contiguous open cell porous structures 48, CNT and CNF are probably the most readily available and cost effective. Except for LIB cathode energy storage particles, every other energy storing and catalyst material can be strongly coupled electrically and physically to these graphene type material structures 50. O$_2$ breathing LIB cathodes do not use these particles. FIG. 4a shows a CNT "buckypaper" structure 52. Buckypaper can be defined as a thin sheet made from an aggregate of non-woven carbon nanotubes. FIG. 4b shows open cell porous structure with fibers 54 coated with strongly coupled Pt particles 56. FIG. 4c shows a contiguous open cell carbon nanofoam 58. FIG. 4d shows a contiguous open cell metal nanofoam 60.

Figure 5:
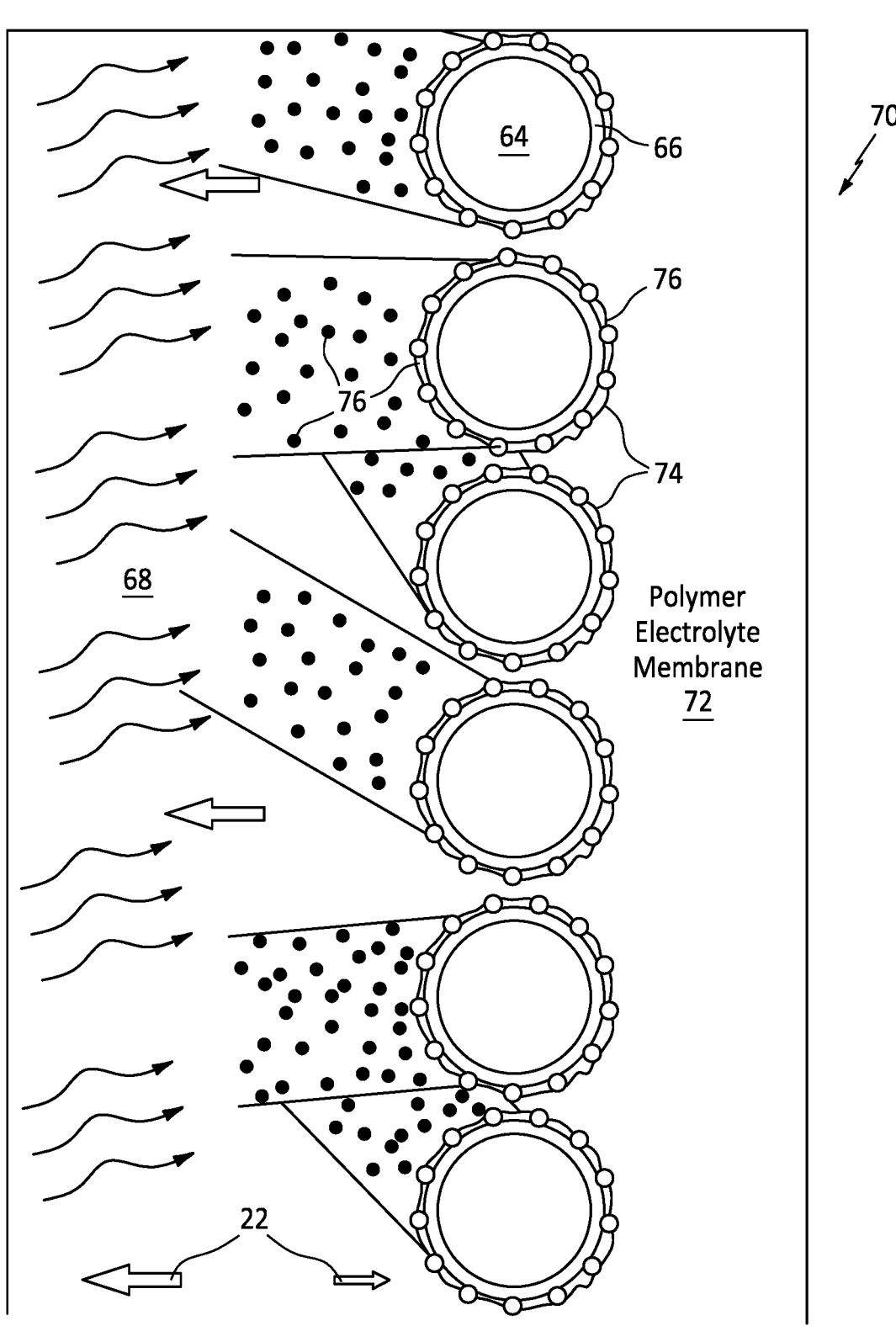
FIG. 5 is a schematic representation of an exemplary fuel cell.

At FIG. 5 an exemplary fuel cell is shown. As a simple example of an application of the disclosure a microscopic section of a popular PEM fuel cell 70 is shown in FIG. 5. An electrically conductive interior 64 in prior art is considered to be a carbon particle 'buckyball' or fullerene comprising a spherical arrangement of carbon atoms. There is no cohesion and poor electrical conduction between such particles. That limits the thickness and energy capacity of a membrane coating on PEM 72. In this invention the interior lumen 64 is intended to depict the center of a single wall CNT 66 although multi-wall versions are also included by reference herein. Reactant gas 68 flows over a nanoscale thin film of electrolyte 74 that diffuses from bulk PEM 72 to coat CNT exterior surfaces between catalyst particles 76 strongly coupled to carbon surfaces. As a conceptual description the 3-phase mutual reaction chemistry is thereby satisfied. Previously used carbon particles coated by an electrolyte 74 interfacial layer retard electron flow through any but the thinnest application of a galvanic membrane 22. Carbon in the form of nanotubes readily conduct electricity in the plane of a much thicker galvanic membrane 22 to and through the pins 18 to a current collector 36 seen in FIGS. 1 and 2. A GM comprising unlimited buckypaper thickness can be employed to obtain substantially higher current density electrodes. As this novel fuel cell membrane is substantially thicker, polymer electrolyte in the form of brushed or sprayed (PEM) ionomer is used to coat an arbitrary thickness of GM. This has no effect on claimed electrical resistance. The thin layer of electrolyte 74 reaches catalyst 76 to promote the obligatory three-phase contact with gas 68. That permits redox reactions to take place rapidly and simultaneously on the many surfaces of CNT.

Figures 6A, 6B:
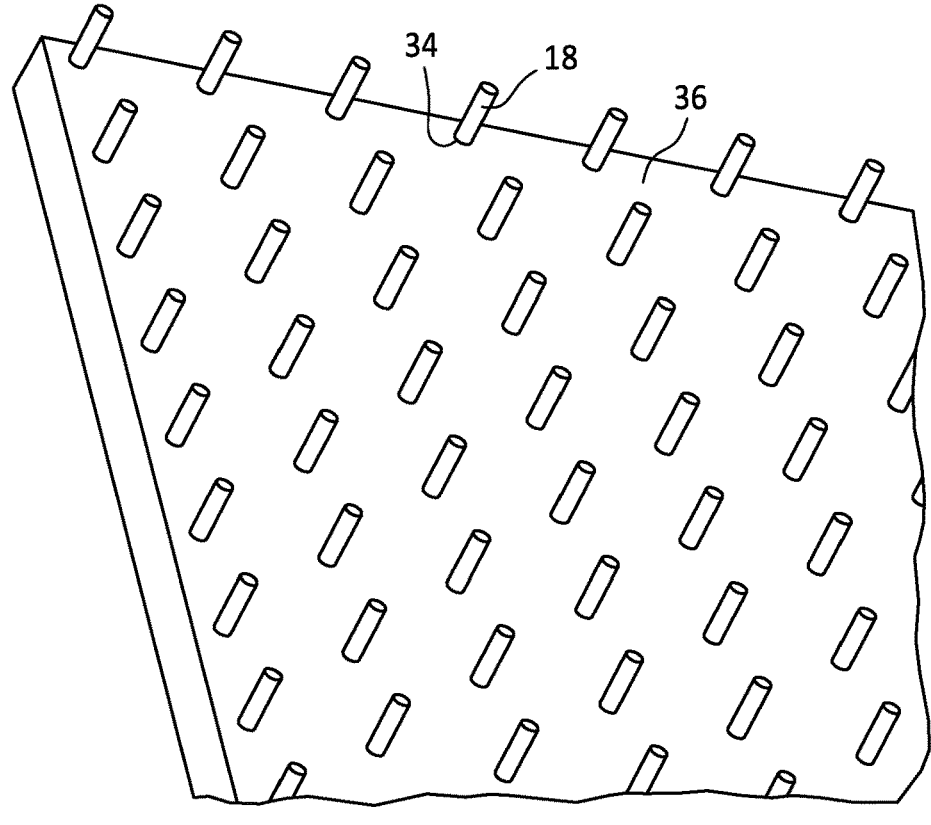
FIG. 6a is a schematic representation of exemplary pins connected to a CC shown with GM stripped away for an unobstructed oblique isometric view.
FIG. 6b is a plan view schematic representation of an exemplary pin pattern.

At FIG. 6 typical pins 18 connected to a CC 36 are shown with GM stripped away for an unobstructed oblique isometric view. A pin base is hi-lighted at 34 but can be seen at the base of other pins 18 with greater magnification. In this representation the bases had no attached membrane to accommodate a gap 42 within the electrode for material entry and/or exit porting. Pin 18 and CC 36 metal are generally but not necessarily of the same material. Also shown is the most efficient pin 18 location distribution that satisfies the requirements of the disclosure. Namely that no point within a GM 22 is further from a closest pin than 3 times the thickness of the GM 22. In a hexagonal pattern every pin is equidistant from every nearest 6 pins. Pin distribution for claimed ultralow resistance is satisfied by this invention.

The disclosure achieves unprecedented low resistance to electrical current by means of novel architecture while simultaneously enabling unrestricted interaction between valence potential chemistry and electrolyte.

This invention accomplishes an actual metallic bond with zero ohmic resistance in the interface between CC metal and the galvanic membrane.

The disclosed invention replaces conductive powders that must be applied to non-cohesive structures with free standing cohesive non-woven Carbon Nanotubes, CNT (buckypaper), Carbon Nanofoam, CNF or graphene, GC layers as a porous contiguous open cell current carrying medium. These and other cohesive free standing electrical conducting membrane forms, further described, are preferred as MEA in this invention because of the high nanoscale surface density they contain. 15 nm diameter CNT at 20% solids volume contains ≈5×10$^3$ cm$^2$/ml coatable surface. 80% MEA volume remains for faradaic/catalytic chemistry and electrolyte. CNF with comparable pore diameter subtracts less volume and is 50% more area efficient to provide ≈3×10$^4$ cm$^2$/ml coatable surface. Hereinafter, MEA shall imply the use of galvanic membranes as just described in this paragraph.

Anodes and cathodes of virtually all electrochemical cells fundamentally comprise a structural combination of the following components. 1) Concentrated micro or nano scale porous surfaces of electrically conductive material, e.g. graphene forms of single crystal amorphous or structured layers, nano tube CNT, open cell foam CNF or conventional graphitic carbon particles that must communicate with and exchange electrical charge with redox faradaic and/or catalytic materials. Said redox materials simultaneously communicate with 2) dielectric electrolyte (solid or liquid). Fuel cells add the further complication of a third phase, namely gas that must share communication with redox, electrically conducting and dielectric electrolyte materials at the nano scale. 3) Suitable carbon structures can efficiently collect charge from chemical reactions, especially when those are strongly coupled to carbon, e.g., catalysts, in electronic double layer supercapacitors (EDLC) and in most faradaic battery couples except at present for Lithium (LIB) cathodes. Carbon can transfer charge over a short distance with reasonably low ohmic resistance. What it cannot do is move that charge into a metal current collector with low resistance across an electrolyte barrier that obtains in all art prior to this invention. This invention completely eliminates that interfacial layer. Charge transfers to cell terminals with metallic resistance.

There is wide opinion that Li-metal anodes will provide an order of magnitude improvement in energy storage capacity respecting present technology although degradation of the Li-metal electrode during cycling in volatile electrolytes prevents stability and longevity. Solid electrolyte is somewhat more stable but does not yet offer a similar energy storage advantage. An interfacial understanding is necessary for developing strategies to commercialize high-energy density and high-power density rechargeable Li metal anodes. Prior art attempts to attach the Li metal directly onto the metal surface of the current collector that conveys charge transfer to the cell terminals. Except for the disclosure, that cannot be done absent an intervening electrolyte interfacial layer which is a high ohmic resistance barrier that limits area specific current density due to high $i^2R$ heat loss. It also leads to the creation of Solid-Electrolyte Interphase (SEI), dendrite growth short circuit through the dielectric separator (e.g., Celgard™) all collectively limiting cycle ability and stability of the LIB. The cathode is subject to even greater interfacial resistance barriers in present LIB.

Pressure, $\approx$1,000 KPa has been applied to assembled polar electrodes in an effort to squeeze out interfacial layers or patterns cut into them to promote attachment to metal surface current collectors with no serious cycling improvement in any of the factors aforementioned producing even faster degradation as fully explored in prior art. Another strategy, but not widely used, employs graphene structures mentioned previously. Si-coated CNT intercalates nearly as much Li as the bare metal on a volumetric basis but attaching the composite membrane to metal surfaces across the interfacial electrolyte layer remains along with all the instabilities hereinabove described. The cathode suffers additional interfacial barriers at its attempt to connect faradaic particles to graphene current collectors that, in turn, cannot attach to the metal current collector without similar barriers. As a result these have not found much use in commerce.

As further detailed within, these barriers are not merely mitigated they are eliminated. The concept is easier to introduce in terms of EDLC energy storage using CNT as the structural backbone or primary current collector. It is more accurately referred to as (Electronic Double Layer Pseudo-capacitance) EDLP best explained by Conway, "*Electrochemical Supercapacitors*", pp. 222-223, Plenum (1999). Many examples of polar binary faradaics develop >2.5 volts when fully charged. Ordinary EDLC stores charges at up to $\approx$0.2 electrons/atom of accessible surface. At 500 to 2,000 μF/cm$^2$ EDLP on an equivalent charge basis, respectively stores 2.5 to 10 electrons/atom. This is competitive with batteries that store 1 to 3 electrons/atom of bulk phase. The ratio of surface to volume for CNT is 4/Diameter. 15 nm CNT with 80% packing to hold electrolyte contains $\approx$2×10$^6$ cm$^2$/ml and stores 4×10$^3$ Farad/ml. Energy is ½ CV$^2$=25×10$^3$ W·s or Joules/ml. The most popular 18650 LIB provides $\approx$$\frac{1}{10}^{th}$ that energy density. A very conservative estimate for EDLP would put them about on par.

In virtually all useful cases EDLP faradaics can be very strongly coupled to functionalized CNT surfaces with negligible interfacial resistance. Liquid electrolyte provides capacitive charge storage at densely populated surfaces of CNT. The disclosure goes to attachment of a CNT membrane to metal having no interfacial layer of electrolyte and no Ohmic resistance at the point of attachment. Ion exchange across Helmholtz layers is virtually instantaneous. EDLP has a different discharge profile that best cuts off at half capacity. Finally, the pattern and distribution of attachments is such that the collective resistance of an extended membrane area of any size is less than 10$^{-5}$ Ω-cm$^2$ with profound influence on its use.

In spite of popular claims to the contrary, standard 18650 LIB can be charged/discharged at recommended ½C to at most 1 C or heat will rapidly degrade cycling performance as earlier noted. Fast charging remains promised but not actually delivered in previously disclosed techniques. In the current disclosure, R in $i^2R$ is reduced by more than 6 orders of magnitude respecting LIB in present use. It follows that i can be increased from less than 10 mA/cm$^2$(½C) to 1 A/cm$^2$-area specific electrode in LIB and >10 A/cm$^2$ in fuel cells. The same applies to EDLP and fuel cells in the disclosure further addressed. What is most important in EDLP is that equivalent series resistance (ESR) allows repetitive half of full capacity cycling at >kHz rates. This should be understood as follows. Capacitor discharge is in accordance with a t=RC time constant where C is in farads and R is the extremely low ESR in this case. Now t can remain extremely short even when electrodes are loaded with very high values of capacity, C. Briefly, half the storable energy can be repetitively charged/discharged in less than 1 millisecond. Deep UV, Excimer or even X-ray laser can be pumped to 3 orders of magnitude higher power than, e.g. a High Energy Liquid Laser Area Defense System (HELLADS) which presently operates at 150 kW. That is a 'Death Ray' but a >150 MW focused beam will melt terrestrial rocks from a stationary Earth orbit in less than 120 milliseconds. It is the same energy but 1,000 times faster than present technology. It is concentrated energy (power) that melts rock.

As catalysts used in this application are universally eligible for strong coupling to CNT surfaces that is a preferred choice for the membrane carbon backbone. The structural stability of a passivated composite galvanic membrane at temperatures to 300° C. make it particularly suited to redox chemistry in hydrocarbon fuel cells.

The overarching parameter ensuring electric charge transfer with negligible ohmic impedance measured between faradaic chemistry and cell terminals in accordance with the disclosure and related cases cited hereinabove requires a widely distributed pattern of small area current collection locations wherein each said location is not further from similar nearest locations to assure that no point within a GM is further from a metal conductor than three times the thickness of the GM. That criterion is based upon the fact that typical cohesive GM material has in-plane electrical conductivity of at least 100 S·cm$^{-1}$ (i.e., 0.01 Ω·cm). Most CNT and CNF membranes meet such criteria at volumetric material density of 20%. Art prior to the disclosure is limited to very thin membrane thickness 50 μm, ergo less energy storage. The opposite is true here where resistance decreases as thickness increases without limit.

For example, EDLC pseudocapacitance having ESR too low to measure may employ 80% CNT or CNF solid density packed with polar faradaics at higher energy density than any LIB. Of course, LIB can be improved in the same way. Fuel cells will use lower density (20%) to achieve fuel/electrolyte permeability >20 Darcy. Depending upon specific application the optimum membrane solid material density across most electrochemical cell designs will be between 20% and 80%. Fuel cells in accordance with the disclosure will use a membrane thickness chosen to achieve close to 100% oxidation in anodes and reduction of O$_2$ in cathodes to serve the purpose of the cell. GM thickness is equivalent to process path length, independent of cell ohmic resistance.

Pins 32 distributed over CC surface 36 in hexagonal array as illustrated in FIG. 6 requires the fewest number of pins to satisfy the GM attachment protocol hereinabove. Every pin is equidistant from its nearest neighbors, of uniform height defining electrode thickness and in total removes less than 3% from active GM electrode area when in accordance with this specification. Pin diameter may be GM thickness and pin height may be limited to no more than 20 times pin diameter in practice. Pin material is any good electrically conducting metal.

The chief attribute of electrodes in accordance with this invention is capacity for unprecedented high current density.

Typical LIB C-rate is 0.01 amp/cm$^2$. It takes 342 cm$^2$ of popular spiral or prismatic wound 18650 electrode to achieve the 3.2 amp-hr. rating. 1 amp/cm$^2$ current density does not begin to challenge the limits of this invention. As examples the same area with 100 times faster charging or a stack of 100 electrodes 3.4 cm$^2$ diameter in series for a 350-volt battery containing the same energy with charging C-rate in 3 minutes. Present fuel cells operate at 1 volt and amp/cm$^2$ although F. Bacon achieved 1 amp/cm$^2$ at 0.8V with pressure and alkali electrolyte. The fundamental limit in every case is i$^2$R heat even for cells operating at high temperature. With >10$^{-5}$ reduction in R, i can be increased more than 100-fold.

Two aspects of this invention are unprecedented regarding popular doctrine, see Newman, J., "*Electrochemical Systems*" pp. 518-538 Wiley 3$^{rd}$ Ed. 2004 wherein electron and proton charge transfer R, are inseparable. And it refers to activity profile zones, FIG. 22.6. Here electron charge transfer R is measured independently of ion mobility as a linear profile of current vs. voltage at t=0 with R independent of membrane thickness. Furthermore, electrodes of this invention charge and discharge uniformly throughout their volume.

There has been provided an ultralow ohmic resistance electrode for electrochemical cells. While the ultralow ohmic resistance electrode for electrochemical cells has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An electrode for electrochemical cells comprising:
an electrically conductive cohesive membrane having a thickness defined by a first surface and a second surface opposite said first surface; said membrane comprising open cell pores and pore surfaces;
a current collector electrically coupled to said pore surfaces; and
pins extending through said membrane from said first surface to said second surface; said pins electrically coupled to said current collector, wherein said pins have an outer surface defining a pin volume, wherein membrane material of said electrically conductive cohesive membrane extends through said pin volume, and wherein pore surfaces of said membrane material within said pin volume are plated with pin material.

2. The electrode for electrochemical cells according to claim 1, wherein said membrane comprises one of a nanoscale contiguous open cell pore structure and a mesoscopic contiguous open cell pore structure.

3. The electrode for electrochemical cells according to claim 1, wherein said pin material of said pins saturates said membrane open cell pores within said pin volume.

4. The electrode for electrochemical cells according to claim 1, wherein each of said pins extend substantially orthogonal from said current collector.

5. The electrode for electrochemical cells according to claim 1, wherein said first surface is substantially parallel to said current collector and said second surface is substantially parallel to said current collector.

6. The electrode for electrochemical cells according to claim 1, further comprising:

a gap formed between said first surface and said current collector, wherein said first surface is adjacent to said current collector.

7. The electrode for electrochemical cells according to claim 1, wherein a bare metal surface of at least one of; the current collector and pins otherwise exposed to electrolyte is coated with a polymer dielectric.

8. The electrode for electrochemical cells according to claim 1, wherein said pin material is metal strongly coupled to said pore surfaces within said pin volume.

9. The electrode for electrochemical cells according to claim 1, wherein membrane pores outside of said pin volume contain electrolyte.

10. The electrode for electrochemical cells according to claim 9, wherein said electrolytes contain either common anions or common cations.

11. An electrochemical unit cell comprising:
a positive electrode and a negative electrode separated by a separator;
each of said positive electrode and said negative electrode including a galvanic membrane comprising an electrically conducting contiguous open cell porous membrane structure saturated by electrolyte and faradaic or catalyst materials; said galvanic membrane having a thickness defined by a first surface and a second surface opposite said first surface;
a current collector proximate to said first surface; and
pins extending through said membrane from said first surface to said second surface; said pins electrically coupled to said current collector, wherein surfaces of said pins define a pin volume, wherein membrane material of said galvanic membrane extends through said pin volume, and wherein pore surfaces of said membrane material within said pin volume are plated with pin material of said pins.

12. The electrochemical unit cell according to claim 11, wherein said separator is selected from the group consisting of an electrolyte/ion permeable dielectric, polymer electrolyte membrane and solid electrolyte.

13. The electrochemical unit cell according to claim 11, wherein said pin material of said pins saturates the open cell porous membrane structure within said pin volume.

14. The electrochemical unit cell according to claim 11, wherein the pins include a pin base proximate the current collector and a pin top located opposite the pin base proximate the separator.

15. The electrochemical unit cell according to claim 11, wherein said galvanic membrane within the pin volume is saturated only with pin material.

16. A process for forming an electrode for an electrochemical unit cell comprising:
providing an electrically conductive cohesive galvanic membrane having a thickness defined by a first surface and a second surface opposite said first surface; said galvanic membrane comprising open cell pores and pore surfaces;
electrically coupling a current collector to said pore surfaces; and
forming pins extending through said galvanic membrane from said first surface to said second surface, wherein said pins have an outer surface defining a pin volume, and wherein membrane material of said cohesive galvanic membrane extends through said pin volume, and pin material of said pins plates pore surface of said membrane material within said pin volume; and
electrically coupling said pins to said current collector.

17. The process of claim 16, wherein said galvanic membrane comprises one of a nanoscale contiguous open cell pore structure and a mesoscopic contiguous open cell pore structure.

18. The process of claim 16, wherein said pin material of said pins saturate said galvanic membrane open cell pores within said pin volume.

19. The process of claim 16, wherein said membrane material within the pin volume is saturated only with pin material.

20. The process of claim 16, further comprising:

forming a gap between said first surface and said current collector.

21. The process of claim 16, wherein said galvanic membrane includes a contiguous open cell pore structure that passes unaltered through the pin volume with which the galvanic membrane makes unimpeded metallic contact while the galvanic membrane provides rigidity and strength to the pin.

* * * * *